United States Patent
Trundle et al.

(10) Patent No.: US 11,436,682 B2
(45) Date of Patent: Sep. 6, 2022

(54) PROPERTY DAMAGE RISK EVALUATION

(71) Applicant: Alarm.com Incorporated, Tysons, VA (US)

(72) Inventors: Stephen Scott Trundle, Falls Church, VA (US); Aaron Eidelman, Tysons, VA (US); Abraham Joseph Kinney, Vienna, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/918,186

(22) Filed: Jul. 1, 2020

(65) Prior Publication Data

US 2021/0004910 A1    Jan. 7, 2021

Related U.S. Application Data

(60) Provisional application No. 62/869,339, filed on Jul. 1, 2019.

(51) Int. Cl.
*G06Q 40/08* (2012.01)

(52) U.S. Cl.
CPC .................. *G06Q 40/08* (2013.01)

(58) Field of Classification Search
None
See application file for complete search history.

(56) References Cited

U.S. PATENT DOCUMENTS

| 9,767,680 | B1 | 9/2017 | Tnindle |
| 9,875,509 | B1 * | 1/2018 | Harvey ................... G06T 17/20 |
| 10,713,726 | B1 * | 7/2020 | Allen ...................... G06Q 40/08 |
| 2014/0358592 | A1 | 12/2014 | Wedig et al. |
| 2015/0370986 | A1 | 12/2015 | Hayward |
| 2017/0039307 | A1 | 2/2017 | Koger et al. |

OTHER PUBLICATIONS

PCT International Search Report and Written Opinion in International Application No. PCT/US2020/040482, dated Sep. 11, 2020, 18 pages.

* cited by examiner

*Primary Examiner* — Joseph W. King
(74) *Attorney, Agent, or Firm* — Fish & Richardson P.C.

(57) ABSTRACT

Methods, systems, and apparatus, including computer programs encoded on a storage device, for monitoring a property are disclosed. A monitoring system includes one or more processors and one or more computer storage media storing instructions that are operable, when executed by the one or more processors, to cause the one or more processors to perform operations comprising: obtaining sensor data from sensors at a property; determining, for a peril, a risk that the peril will occur at the property based on risk factors determined from the sensor data; selecting a particular risk factor from the risk factors based on the risk that the peril will occur at the property; and providing an indication of the particular risk factor.

21 Claims, 3 Drawing Sheets

PROPERTY DAMAGE RISK EVALUATION

CROSS-REFERENCE TO RELATED APPLICATION

This application claims the benefit of U.S. Application No. 62/869,339, filed Jul. 1, 2019, which is incorporated by reference in its entirety.

TECHNICAL FIELD

This disclosure application relates generally to property monitoring systems.

BACKGROUND

Many properties are equipped with monitoring systems that include sensors and connected system components. Monitoring systems can be used to evaluate and mitigate the risk of property damage.

SUMMARY

Many residents and homeowners equip their properties with monitoring systems to enhance the security, safety, or convenience of their properties. Techniques are described for evaluating and mitigating the risk of property damage based on monitoring system data.

Monitoring systems can determine the risk of property damage based on analyzing sensor data indicating various characteristics of the property. Monitoring systems can correlate sensor data with the frequency of property damage incidents due to various perils. Perils can include, for example, fire damage, water damage, and security damage. Property monitoring systems can provide users with information that describes the risk of property damage. Monitoring systems can recommend actions that users may take to reduce the risk of property damage.

According to an innovative aspect of the subject matter described in this application, a monitoring system includes one or more processors and one or more computer storage media storing instructions that are operable, when executed by the one or more processors, to cause the one or more processors to perform operations including: obtaining sensor data from sensors at a property; determining, for a peril, a risk that the peril will occur at the property based on risk factors determined from the sensor data; selecting a particular risk factor from the risk factors based on the risk that the peril will occur at the property; and providing an indication of the particular risk factor.

This and other aspects can each optionally include one or more of the following features, alone or in combination. In some implementations, determining the risk that the peril will occur includes: obtaining sensor data from a plurality of properties indicating one or more risk factors of the plurality of properties; obtaining damage data indicating a frequency of damage incidents at the plurality of properties caused by the peril; identifying, based on the sensor data and the damage data, a weighted impact of each risk factor on the frequency of damage incidents caused by the peril; and applying the weighted impact of each risk factor to the risk factors determined from the sensor data obtained from the sensors at the property.

In some implementations, determining the risk that the peril will occur includes determining a probability that the peril will occur at the property.

In some implementations, selecting the particular risk factor includes selecting the risk factor having the highest risk for the peril.

In some implementations, the operations include determining a risk that each of multiple types of perils will occur at the property.

In some implementations, the operations include receiving data indicating a user risk tolerance for each of the multiple types of perils; determining, based on the user risk tolerance for each of the multiple types of perils, the peril having the lowest user risk tolerance; and selecting the risk factor having the highest risk for the peril having the lowest user risk tolerance.

In some implementations, selecting the particular risk factor includes selecting the risk factor having the highest risk for the peril having the highest risk of occurring.

In some implementations, the operations include: determining that the risk for the peril exceeds a risk tolerance for the peril; and in response to determining that the risk for the peril exceeds the risk tolerance for the peril, providing the indication of the particular risk factor.

In some implementations, the operations include determining a combined risk for multiple types of perils.

In some implementations, selecting the particular risk factor includes selecting the risk factor having the highest contribution of risk to the combined risk.

In some implementations, the operations include: determining that the combined risk exceeds a combined risk tolerance; and in response to determining that the combined risk exceeds the combined risk tolerance, providing the indication of the particular risk factor.

In some implementations, providing the indication of the particular risk factor includes providing a notification to a user device to recommend an action to reduce risk of the peril.

In some implementations, the operations include performing a monitoring system action to reduce the risk of the peril occurring at the property.

In some implementations, the peril includes an incident that causes damage to the property.

In some implementations, the peril includes one of a fire-related peril, a water-related peril, or a security-related peril.

In some implementations, each of the risk factors includes an attribute of the property that affects the likelihood of damage to the property due to the peril.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
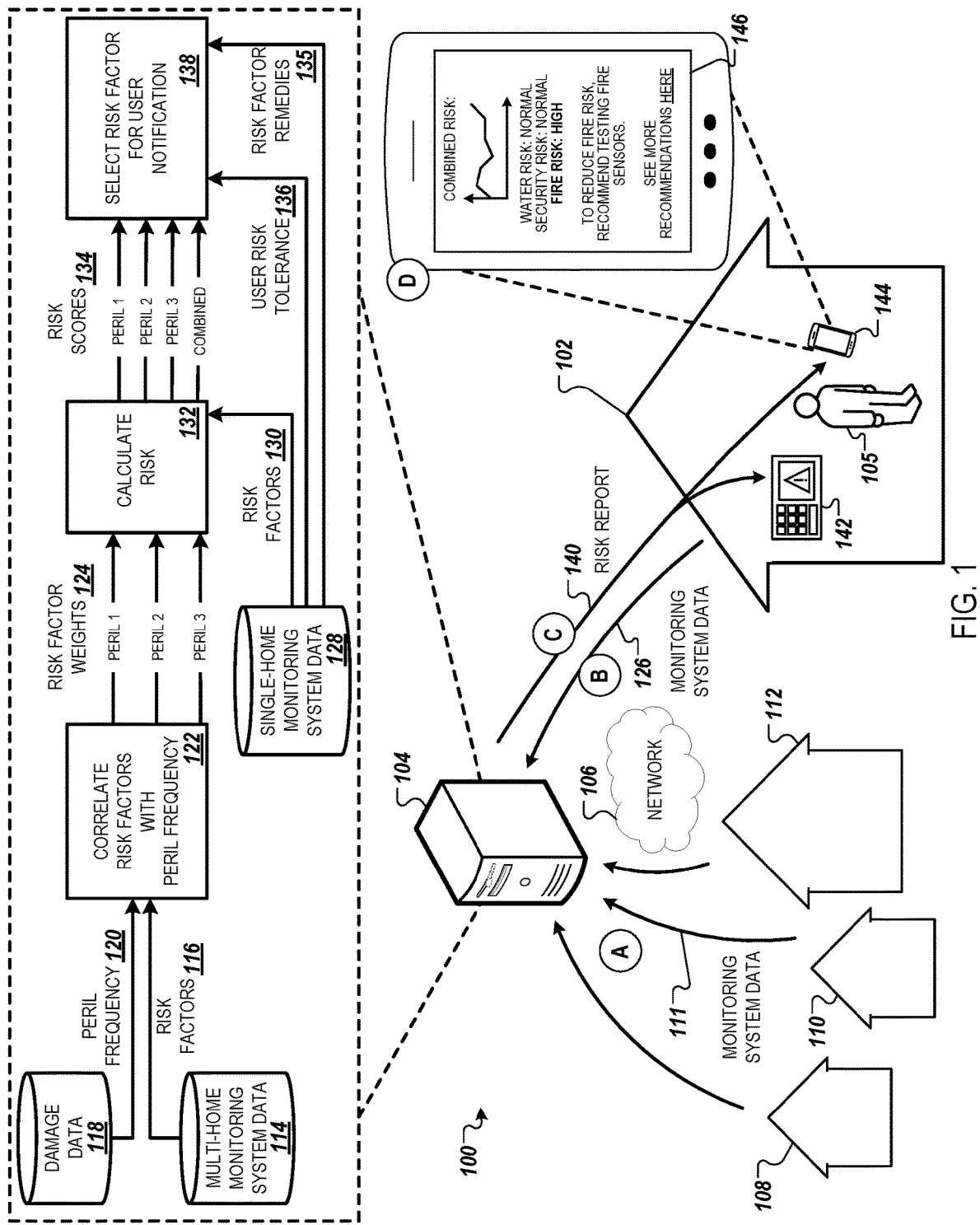
FIG. 1 illustrates an example operating environment for evaluating and mitigating the risk of property damage based on monitoring system data.

FIG. 1 illustrates an example operating environment 100 for evaluating and mitigating the risk of property damage based on monitoring system data.

In FIG. 1, a property 102 is monitored by a property monitoring system. The property 102 can be a home, another residence, a place of business, a public space, or another facility that is monitored by a monitoring system. The user 105 of the monitoring system can be, for examples, a resident, landlord, or tenant of the property 102. The monitoring system of the property 102 connects to a server 104 over a network 106.

The server 104 may be, for example, one or more computer systems, server systems, or other computing devices that are located remotely from the property 102 and that are configured to process information related to the monitoring system at the property 102. In some implementations, the server 104 is a cloud computing platform.

The network 106 can be any appropriate long-range data link. The network 106 can include any combination of wired and wireless data networks. For example, the network 106 can be a wide-area-network (WAN), a broadband internet connection, a cellular telephony network, a wireless data network, a cable connection, a digital subscriber line (DSL), a satellite connection, or other electronic means for data transmission.

The properties 108, 110, and 112 are also monitored by monitoring systems. In stage (A) of FIG. 1, the monitoring systems send monitoring system data 111 from the properties 108, 110, and 112 to the server 104 over the network 106. The data 111 can include data from various sensors at the properties. For example, the data 111 can include data from door and window lock sensors, surveillance cameras, microphones, water sensors, fire sensors, and light sensors. The data 111 can also include the configuration of the monitoring systems, e.g., indicating whether the monitoring systems are armed or disarmed.

For example, data 111 from the property 108 may include that the property 108 has four fire sensors, two water sensors, and one sump pump. The data 111 may include that at least one resident of the property 108 is a smoker, as determined through monitoring system analysis of air quality sensors. The data 111 may include that the residents of the property 108 use the oven approximately three times per week, without using oven ventilation, and that the residents of the property 108 arm the monitoring system most nights, but typically do not arm the monitoring system during the daytime.

The server 104 collects the data 111 from the properties 108, 110, 112, and other properties, in a multi-home monitoring system database 114. The server 104 analyzes the data in the multi-home monitoring system database 114 to determine various risk factors 116. A risk factor 116 is any attribute of a property that may affect the likelihood of damage to the property due to various perils. Example perils to a property can be fire damage, water damage, and security damage.

Some example risk factors 116 for fire damage are the number of fire sensors, the frequency of testing fire sensors, the frequency of oven usage, and the frequency of smoking at a property. Some example risk factors 116 for water damage are the number of water sensors, the number of sump pumps, the flow rate of water through pipes, and degradation of the roof and gutters. Some example risk factors 116 for security damage are occupancy rates, outdoor lighting, door and window lock status, and lawn care status.

The server 104 collects damage data 118. The damage data 118 is data related to property damage caused by one or more perils, e.g., fire damage, water damage, and security damage. The damage data 118 can come from various sources. For example, the damage data 118 can come from public records related to insurance claims. The insurance claims can include, e.g., homeowner's insurance claims, health insurance claims, and flood insurance claims. The damage data 118 can also come from public records related to emergency dispatches, e.g., police, fire, and ambulance. The damage data 118 can include crime rates and census data for individual cities and neighborhoods. In some examples, the damage data 118 can come from the monitoring systems. In some examples, the damage data 118 can be provided by users of monitoring systems.

Example damage data 118 for the property 108 may include that the owners of the property 108 have filed two homeowner's insurance claims for water damage, and one homeowner's insurance claim for fire damage, within the past two years. Monitoring system data may indicate that the property 108 has experienced fire alarm activation four times over the past two years. User-provided data may indicate that three of the four fire alarm activations were false alarms. Emergency dispatch data may indicate that the property 108 has had one fire dispatch over the past two years.

The server 104 analyzes the damage data 118 to determine the peril frequency 120 of the properties 108, 110, 112, and other properties. For example, the server 104 may analyze the damage data 118 to determine that the property 108 has experienced, on average, one water damage incident per one-year period, and one fire damage incident per two-year period.

The server 104 correlates 122 the risk factors 116 with the peril frequencies 120 to determine risk factor weights 124 for each peril. Risk factor weights 124 are an indication of the relative impact of each risk factor 116 on the likelihood of damage due to the various perils. For example, the server 104 may correlate 122 the number of fire sensors installed in the properties 108, 110, 112, and other properties, with the frequency of fire damage to those properties. The server 104 may determine that there is a high correlation between the number of fire sensors installed and the frequency of fire damage, i.e., increased numbers of fire sensors greatly reduce the likelihood of fire damage. The server 104 may also correlate 122 the frequency of oven usage with the frequency of fire damage. The server 104 may determine that there is a low correlation between the frequency of oven usage and the frequency of fire damage, i.e., increased oven usage slightly increases the likelihood of fire damage. Based on the correlations 122, the server 104 may determine a higher risk factor weight 124 for the number of fire sensors, and a lower risk factor weight 124 for the frequency of oven usage, in relation to fire damage. The correlation 122 of risk factors 116 with peril frequencies 120 evolves over time, as additional damage data 118 and monitoring system data 111 are collected and analyzed.

Certain risk factors 116 may affect the peril frequency 120 of more than one peril. For example, the occupancy of a property may affect the likelihood of fire damage, water damage, and security damage. A property that is left unoccupied for extended periods of time may have unnoticed maintenance issues that could lead to water and fire damage. A property that is left unoccupied for extended periods of time may also be susceptible to intrusion and burglary. A monitoring system can determine the occupancy of a property based on data 111 from various sensors, e.g., motion sensors, microphones, light sensors, and surveillance cameras. The server 104 correlates 122 the risk factors 116 with the peril frequencies 120 and can determine different risk factor weights 124 for a single risk factor 116, in relation to individual perils. For example, the server 104 may determine that there is a low correlation between occupancy and fire damage. The server 104 may determine that there is a high correlation between occupancy and security damage. The server 104 can therefore determine a lower risk factor weight 124 for occupancy in relation to fire damage, and a higher risk factor weight 124 for occupancy in relation to security damage.

In stage (B) of FIG. 1, the monitoring system of the property 102 sends data 126 from the property 102 to the server 104 over the network 106. The server 104 collects the data 126 from the property 102 in a single-home monitoring system database 128.

The server 104 analyzes the data in the single-home monitoring system database 128 to determine the risk factors 130 of the property 102. For example, the data in the single-home monitoring system database 128 may indicate the following risk factors 130 of the property 102, related to the peril of fire damage. The property 102 has three fire sensors, but does not have an installed sprinkler system. The three fire sensors were each tested thirteen months ago. At least one resident of the property 102 is a smoker. The residents of the property 102 use the oven approximately twice per week, and typically use ventilation when the oven is on. The ventilation system flow rate has reduced by 10% over the past 6 months, indicating a potential clog.

The single-home monitoring system database 128 can include maintenance records from the property 102. For example, maintenance records can indicate the age of appliances at the property 102 and the frequency of maintenance checks on the appliances. Maintenance records can be provided, for example, by a resident at the property 102, by the installer of the monitoring system, and/or by maintenance professionals performing work at the property 102. Maintenance records can be provided through the monitoring system control panel 142 and/or through an application on a computing device.

The single-home monitoring system database 128 can include the user risk tolerance 136. The user risk tolerance 136 indicates the user 105's priorities for managing the risk of property damage. For example, in neighborhoods with high crimes rates, the user risk tolerance 136 for security damage may be lower than in neighborhoods with low crime rates. In geographic areas with hot, dry climates, the user risk tolerance 136 for fire damage may be lower than in areas with cooler climates. In some examples, the user risk tolerance 136 can be set to a default level by the manufacturer of the property monitoring system and adjusted by the installer and/or the user 105. The user risk tolerance 136 can include, for example, a threshold risk score that the user 105 wants to maintain for each peril and/or for a combination of perils.

The single-home monitoring system database 128 can include risk factor remedy 135 data. For each risk factor 130, a risk factor remedy 135 is a potential action that the user 105 can take to mitigate, reduce, or eliminate the risk factor 130. The risk factor remedy 135 can include the expected cost, e.g., financial cost and/or time cost, of the risk factor remedy 135.

The server 104 calculates 132 the risk scores 134 of the property 102 based on the risk factors 130 and the risk factor weights 124. The server 104 can calculate 132 the risk scores 134 for individual perils, and can calculate 132 a combined risk score 134 for all perils.

For example, the server 104 calculates 132 the risk of fire damage at the property 102 based on the risk factors 130 and the risk factor weights 124 for fire damage. The risk score 134 may be, for example, a numerical value out of a maximum value, e.g., 100, where higher scores indicate lower risk of damage. In some examples, the risk score 134 may be a probability of damage, where higher probabilities indicate higher risk of damage Based on the risk scores 134 and the user risk tolerance 136, the server 104 selects 138 a risk factor 130 for user 105 notification. The server 104 can select 138 the risk factor 130 for user 105 notification using a pre-programmed method and/or based on user-selected preferences. In some examples, the server 104 may select 138 the single-home risk factor 130 with the highest contribution to the highest-risk peril. For the property 102, the highest-risk peril is fire damage. The single-home risk factor 130 with the highest contribution to the risk of fire damage is the fire sensor test frequency, because the fire sensors have not been tested in thirteen months. The server 104 selects 138 the risk factor 130 of fire sensor test frequency for user 105 notification.

In some examples, the server 104 may select 138 the risk factor 130 for user 105 notification using cost-benefit analysis. For example, the property 102 may have two or more risk factors 130 contributing equally, or approximately equally, to the risk of fire damage. The server 104 may select 138 the risk factor 130 for user 105 notification that results in the greatest reduction in risk with the least amount of cost. For example, two risk factors 130 with approximately equal contributions to the risk of fire damage for the property 102 might be the fire sensor test frequency and the absence of an installed sprinkler system. The risk factor remedy 135 for the fire sensor test frequency is to test the fire sensors, which is a low cost risk factor remedy 135. The risk factor remedy 135 for the absence of an installed fire sprinkler system is to install a fire sprinkler system, which is a high cost risk factor remedy 135. The server 104 can perform cost-benefit analysis to determine that testing the fire sensors can provide the benefit of reducing the risk of fire damage at the property 102 with a lower cost compared to installing a fire sprinkler system. Therefore, to reduce fire risk, the server 104 may select 138 to notify the user 105 of the risk factor 130 of fire sensor test frequency, instead of notifying the user of the risk factor 130 of the absence of an installed sprinkler system.

The server 104 can select 138 the risk factor 130 for user 105 notification with consideration of the user risk tolerance 136. For example, the user risk tolerance 136 may indicate that the user 105 has a higher tolerance for water damage risk than for fire damage risk. Therefore, if the risk of water damage and fire damage are approximately the same, the server 104 may select 138 a risk factor 130 related to fire damage for user 105 notification.

In some examples, the server 104 may select 138 a risk factor 130 for user 105 notification based on anomalies at the property 102. For example, the risk score 134 for security damage may typically be at a certain level. The risk score 134 for security damage may increase if the residents of the property 102 leave the house unoccupied for an extended period of time without arming the monitoring system. The server 104 can determine that there is an anomaly, due to the increase in security risk. In this case, the server 104 may select 138 the risk factor 130 of the unarmed monitoring system for user 105 notification.

In some examples, the server 104 may select 138 multiple risk factors 130 for user 105 notification. The server 104 may select 138 multiple risk factors 130 based on pre-programmed criteria and/or user 105 input. For example, the user 105 may input a preference for the server 104 to select one risk factor 130 for each peril. In some examples, the server 104 may select multiple risk factors 130 with the highest contributions to the combined risk of damage, or multiple risk factors 130 selected using cost/benefit analysis.

In stage (C) of FIG. 1, the server 104 sends a risk report 140 to the monitoring system of the property 102. The risk report 140 can include risk scores 134 for individual perils, and a combined risk score 134. The risk report 140 can include trend line analysis of the property 102's risk scores over time. The risk report 140 can also include recommendations for risk factor remedies 135 to mitigate the risk of property damage.

The monitoring system can display the risk report 140, including recommendations for risk factor remedies 135, on the monitoring system control panel 142 and/or on a mobile device 144 or other computing device.

In stage (D) of FIG. 1, the user 105 views, on the display 146 of the mobile device 144, the risk report 140. The display 146 shows a trend line of the combined risk score 134 over time. For example, the display 146 can show a trend line of the combined risk score 134 over the past thirty days. The trend line of the combined risk score 134 shows that there has been a recent increase in combined risk at the property 102.

The display 146 also shows the individual risk scores 134 for each peril. The risk scores 134 for each peril show that the water risk and security risk scores 134 are "normal," while the fire risk is "high." In some examples, the display 146 can show the risk scores 134 as color-coded categories such as "green" and "red," as a numerical score, or both.

The display 146 can show a recommendation for one or more risk factor remedies 135, based on the selection 138 of the risk factor 130 for user 105 notification. The recommendation for risk factor remedies 135 is, "to reduce fire risk, recommend testing fire sensors." The user 105 has the option of viewing additional recommendations to further reduce risk.

In some examples, the monitoring system can prompt the user 105 to approve certain automatic monitoring system actions to mitigate risk. For example, the monitoring system may select 138 the risk factor 130 of an unarmed monitoring system for user 105 notification. The risk report 140 can include a prompt for the user 105 to approve automatically arming the monitoring system through the control panel 142 and/or the mobile device 144.

In some examples, the server 104 can send the risk report 140 to the monitoring system on a periodic basis, i.e., daily or weekly. The control panel 142 and/or mobile device 144 can display a notification when the risk report 140 is available. In some examples, the server 104 can generate the risk report 140 when requested by the user 105 through the control panel 142 or the mobile device 144. In some examples, the server 104 can generate the risk report 140 when the server 104 detects an anomaly in the risk scores 134 of the property 102. The control panel 142 and/or mobile device 144 can display a notification when there is a change in the risk scores 134 for the property 102.

Figure 2:
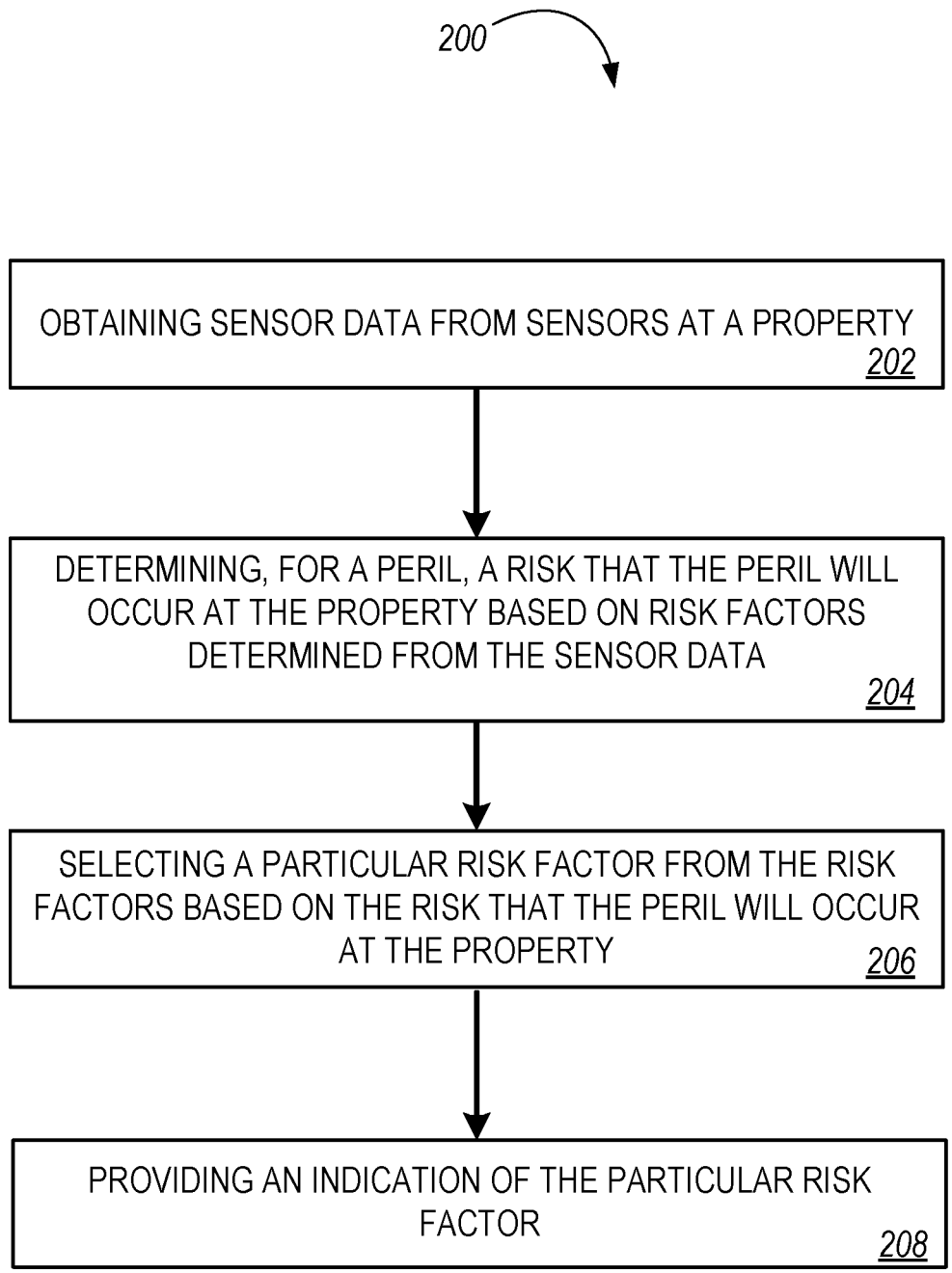
FIG. 2 is a flowchart of an example process for evaluating and mitigating the risk of property damage based on monitoring system data.

FIG. 2 is a flowchart of an example process 200 for evaluating and mitigating the risk of property damage based on monitoring system data. The process 200 can be performed by one or more computer systems, for example, the server 104. In some implementations, some or all of the process 200 can be performed by a computer system such as a control unit that is located at the monitored property.

Briefly, the process 200 includes obtaining sensor data at a property (202), determining a risk that a peril will occur at the property (204), selecting a particular risk factor (206), and providing an indication of the particular risk factor (208).

The process 200 includes obtaining sensor data from sensors at a property (202). For example, server 104 may receive sensor data, e.g., single-home monitoring system data 128, from the monitoring system control panel 142. The single-home monitoring system data 128 may indicate that the fire sensors have not recently been tested and that the ventilation system flow rate has recently reduced. The sensor data can include data from various sensors such as door and window lock sensors, surveillance cameras, microphones, water sensors, fire sensors, motion sensors, and light sensors. The sensor data can also include the configuration of property monitoring systems, e.g., indicating whether the property monitoring systems are armed or disarmed.

The process 200 includes determining, for a peril, a risk that the peril will occur at the property based on risk factors determined from the sensor data (204). A peril can be an incident that causes damage to the property. A peril can include a fire-related peril, a water-related peril, or a security-related peril. A fire-related peril can include, for example, an electrical fire or gas fire causing damage to the property. A water related peril can include, for example, a pipe burst or a basement flood causing damage to the property. A security-related peril can include a break-in or a burglary that causes damage to the property.

A risk factor is an attribute of the property that affects the likelihood of damage to the property due to the peril. For example, for fire-related perils, risk factors can include a material construction of the property, a heating fuel source of the property, an age of the property, a number of smoke detectors, a location of smoke detectors, an age of smoke detectors, etc.

Determining the risk that the peril will occur can include obtaining sensor data, e.g., the multi-home monitoring system data 114 from multiple properties, e.g., the properties 108, 110, 112. The server 104 can obtain sensor data that indicates one or more risk factors 116 of the multiple properties. For example, the multi-home monitoring system data 114 can include a number of fire sensors at each property of the multiple properties. The multi-home monitoring system data 114 can also include an average number of fire sensors at the multiple properties. The multiple properties can include properties within a region such as a neighborhood or a city. The multiple properties can also include properties that each are monitored by monitoring systems that communicate with the same monitoring server.

The monitoring system can also obtain damage data, e.g., the damage data 118, indicating a frequency of damage incidents caused by the peril, e.g., the peril frequency 120, at the multiple properties. For example, the server 104 can obtain damage data 118 indicating the peril frequency 120 of fire-related damage at the multiple properties. The damage data 118 may indicate, for example, that the multiple properties incur fire-related damage at an average peril frequency 120 of once per ten years.

The monitoring system can identify, based on the sensor data and the damage data, a weighted impact of each risk factor on the frequency of damage incidents caused by the peril. For example, the server 104 can correlate the risk factors 116 with the peril frequency 120 in order to identify, based on the multi-home monitoring system data 114 and the damage data 118, the risk factor weights 124. The risk factor weights 124 indicate the weighted impact of each of the risk factors 116 on the peril frequency 120.

For example, the server 104 may determine that properties having the same number of fire sensors as the number of bedrooms incur fire damage at a frequency of once per twelve years, and that properties having fewer fire sensors than the number of bedrooms incur fire damage at a frequency of once per eight years. The server 104 may determine that properties having gas as a heating fuel source incur fire damage at a frequency of once per ten years and that properties having electricity as a heating fuel source incur fire damage at a frequency of once per nine years. Thus, due to the heating fuel source having a lesser impact on the peril frequency 120 than the number of fire sensors, the server 104 may determine a higher risk factor weight 124 for the risk factor 116 of the number of fire sensors and a lower risk factor weight 124 for the risk factor 116 of the heating fuel source.

To determine the risk that the peril will occur at the property, the monitoring system may consider the weighted risk factor contribution to the likelihood of the peril occurring. The monitoring system can consider the weighted risk factor contribution by applying the weighted impact of each risk factor to the risk factors determined from the sensor data obtained from the sensors at the property. For example, the server 104 can apply the risk factor weights 124 to each of the risk factors 130 in order to calculate the risk scores 134 of each peril.

As an example, the risk factors 130 may include that the property 102 has the same number of fire sensors as bedrooms, and that the property has electricity as a heating fuel source. The server 104 can apply the appropriate risk factor weights 124 to these risk factors 130 to calculate a risk score 134 for fire damage. The risk score 134 may be, for example, a status, e.g., "low" or "high" risk for fire-related perils.

In some implementations, determining the risk that the peril will occur includes determining a probability that the peril will occur at the property. For example, the risk score 134 may be a numerical probability of the peril occurring, e.g., a risk score 134 of 15% or 30% for fire-related perils.

In some implementations, the monitoring system can determine a risk that each of multiple types of perils will occur at the property. For example, the server 104 may determine that the water-related peril risk is normal, the security-related peril risk is normal, and the fire-related peril risk is high.

In some implementations, the monitoring system can determine a combined risk for multiple types of perils. The process can include combining the risk that different perils will occur at the property into a combined risk score. The combined risk score can represent a likelihood that damage will occur at the property due to any type of peril.

For example, the server 104 may determine that the water-related peril risk is 30%, the security-related peril risk is 10%, and the fire-related peril risk is 40%. The server 104 can calculate a combined risk score, e.g., by calculating an average risk or a weighted average risk. For example, the monitoring server may determine a combined risk score of 27% for any type of damage occurring at the property.

The process 200 includes selecting a particular risk factor from the risk factors based on the risk that the peril will occur at the property (206). Selecting the particular risk factor can include selecting the risk factor having the highest risk for the peril.

Selecting the particular risk factor can include receiving data indicating a user risk tolerance for each of the multiple types of perils. For example, the user risk tolerance 136 can include an indication of the user 105's priorities for managing the risk of damage caused by each peril. As an example, the user risk tolerance 136 may include a risk tolerance of 25% risk for water-related perils, 40% risk for security-related perils, and 10% for fire-related perils.

Selecting the particular risk factor can include determining, based on the user risk tolerance 136 for each of the multiple types of perils, the peril having the lowest user risk tolerance, and selecting the risk factor having the highest risk for the peril having the lowest user risk tolerance. For example, the user 105 may have the lowest user risk tolerance 136 for fire-related perils, e.g., a risk tolerance of 10%. The risk score for fire-related perils may be 40%. The factors contributing to the risk score for fire-related perils may be the number of fire sensors and the amount of time since the fire sensors were tested. The risk factor 116 having the highest risk for fire-related perils may be the amount of time since the fire sensors were tested. Thus, the monitoring system can select the risk factor 116 of the amount of time since the fire sensors were tested.

In some implementations, the monitoring system can select the risk factor having the highest contribution of risk to the combined risk. For example, the property may typically be unoccupied. The occupancy of the property can be a risk factor 130 that contributes to the risk of water-related perils and to security-related perils. Thus, the contribution of the risk factor 130 of occupancy may have the highest contribution to the combined risk compared to other risk factors. Thus, the monitoring system can select the risk factor 130 of occupancy.

In another example, the server 104 may select the fire sensor test frequency from amongst the risk factors of the fire sensor test frequency and the ventilation system flow rate. The risk factor can be selected using a pre-programmed method and/or based on user-selected preferences. The risk factor can be selected with consideration of the user risk tolerance. For example, the user 105 may have a higher risk tolerance for water damage than for fire damage, causing the server 104 to select fire-related risk factors over water-related risk factors.

In some implementations, selecting the particular risk factor includes selecting the risk factor having the highest risk for the peril having the highest risk of occurring. The risk factor is thus selected based on having the highest contribution to the highest-risk peril. For example, the server 104 may select the fire risk from amongst the fire risk, water risk, and security risk. The server 104 may then select the highest contribution risk factor for the fire risk. For example, the highest contribution risk factor for the fire risk may be the frequency of oven usage at the property. The server 104 can then select the risk factor of the frequency of oven usage based on the risk factor having the highest risk for fire-related perils.

In some examples, the risk factor is selected using cost-benefit analysis. For example, testing the fire sensors is a low cost risk factor remedy 135, while cleaning out the ventilation system is a higher cost risk factor remedy 135. Therefore, the server 104 may select the fire sensor test frequency over the ventilation system flow rate. In some examples, the risk factor is selected based on anomalies at the property. For example, if the ventilation system flow rate decreases significantly in a short period of time, the server 104 may select the ventilation system flow rate. In some examples, more than one risk factor is selected. For example, if the fire sensor test frequency and the ventilation system flow rate have an approximately equal contribution to the fire risk, the server 104 may select both of the risk factors.

The process 200 includes providing an indication of the particular risk factor (208). In some implementations, the monitoring system can determine that the risk for the peril exceeds a risk tolerance for the peril. In response to determining that the risk for the peril exceeds the risk tolerance for the peril, the monitoring system can provide the indication of the particular risk factor. For example, the user risk tolerance 136 for water-related perils of 25%. The server 104 may determine that the risk of water-related perils is 30%. The server 104 may select a particular water-related risk factor 130 of a loss of power to a sump pump. In response to determining that the risk for water-related perils is greater than the risk tolerance, the server 104 can provide the indication of the loss of power to the sump pump.

In some implementations, the monitoring system can determine that the combined risk exceeds a combined risk tolerance. In response to determining that the combined risk exceeds the combined risk tolerance, the monitoring system can provide the indication of the particular risk factor. For example, the combined risk tolerance may be 40%. The server 104 may determine that the combined risk is 50%, and therefore exceeds the combined risk tolerance. The monitoring system can select a particular risk factor, e.g., the front door being unlocked, that is contributing to the combined risk. In response to determining that the combined risk is greater than the combined risk tolerance, the monitoring system can provide the indication of the unlocked front door.

Providing the indication of the particular risk factor can include providing a notification to a user device to recommend an action to reduce risk of the peril. For example, the server 104 can send a notification to the mobile device 144 to recommend an action. In some examples, the recommended action may be an action to be performed by a user 105, e.g., manually locking the front door. In some examples, the recommended action may be an action to be performed by the monitoring system, e.g., sending a signal to a smart door lock to lock the front door.

In some examples, the monitoring system can prompt the user to select to make a change to the monitoring system. For example, the monitoring system can recommend to the user 105 to adjust settings of an automatic lock at the property, e.g., to lock the front door at an earlier time in the evening. The user 105 can select to accept or refuse the recommendation. In response to the user 105 accepting the recommendation, the monitoring system can adjust the settings of the automatic lock.

In some examples, the monitoring system can perform a monitoring system action to reduce the risk of the peril occurring at the property. For example, the server 104 may send a signal to a smart door lock to lock the front door, with or without confirmation from the user 105.

As an example, the server 104 may generate a risk report 140 and send the risk report 140 to the mobile device 144 for display. The indication of the particular risk factor can include a notification and/or alert sent to the monitoring system control panel 142, a user's computing device such as the mobile device 144, or both. The indication of the particular risk factor can include one or more recommendations for risk factor remedies 135. For example, the recommendation can be that that the user 105 test the fire sensors. The indication of the particular risk factor can also include the overall risk assessment of the property in relation to the different types of perils. For example, the indication of the risk factor of the fire sensor test frequency can include an assessment that the overall risk assessment for fire damage is high.

Figure 3:
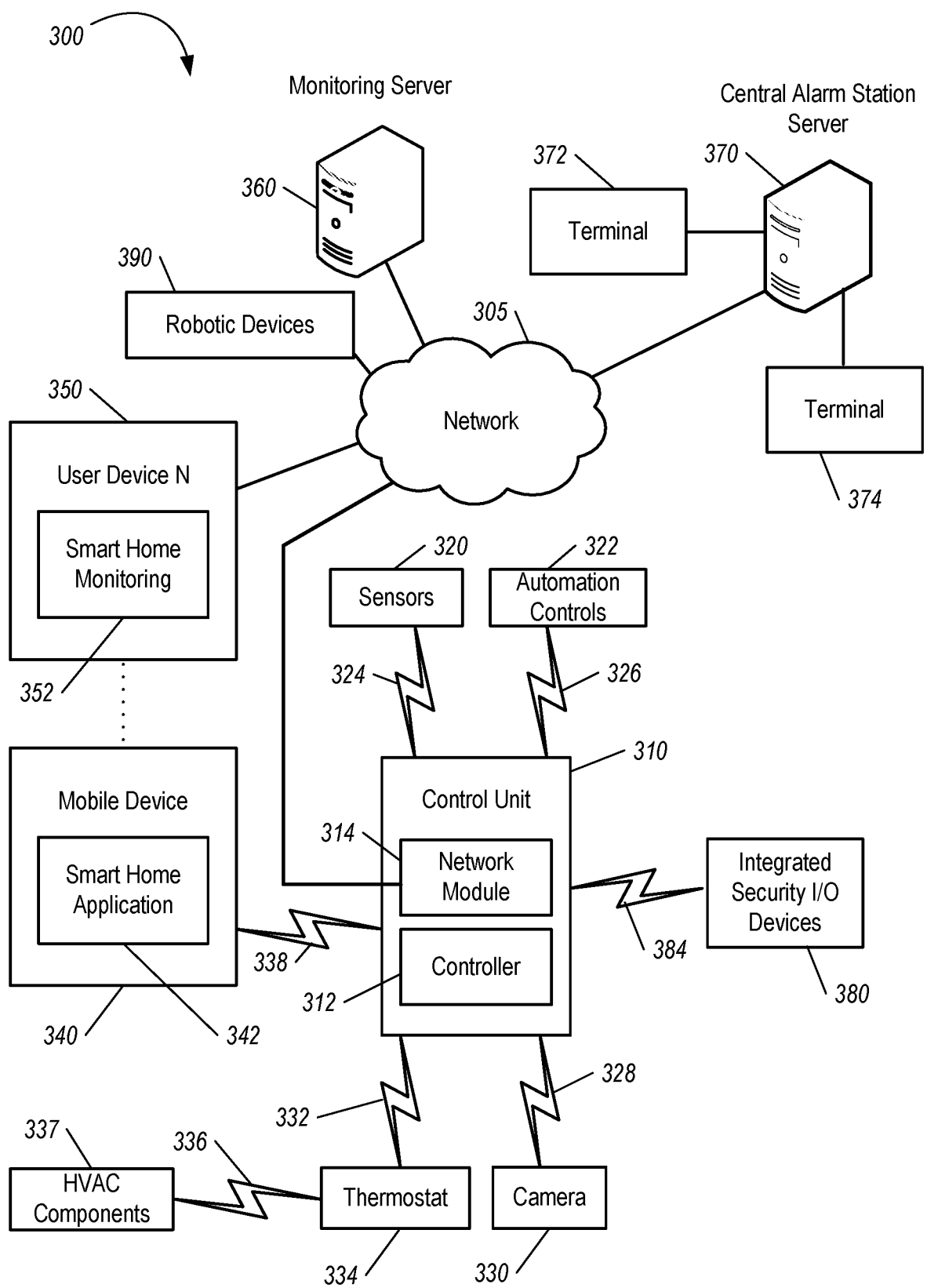
FIG. 3 is a diagram illustrating an example of a home monitoring system.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300 (e.g., user 105). For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system comprising:
one or more computers and one or more computer storage media storing instructions that are operable, when executed by the one or more computers, to cause the one or more computers to perform operations comprising:
obtaining, by a monitoring server, sensor data from sensors at a property, the sensor data including data indicating an unarmed status of a setting of an alarm device at the property;
determining, by the monitoring server and for a peril, a risk that the peril will occur at the property based on risk factors determined from the sensor data;
selecting, by the monitoring server, a particular risk factor from the risk factors based on the risk that the peril will occur at the property;
determining, using the particular risk factor and the data indicating the unarmed status of the setting of the alarm device at the property, a recommended adjustment to the setting i) of the alarm device at the property ii) from the unarmed status to an armed status that decreases the likelihood of damage to the property due to the peril;
providing, for display by a computing device, a notification including:
an indication of the particular risk factor; and
a user interface element enabling selection of an option to approve the recommended adjustment to the setting that decreases the likelihood of damage to the property; and
in response to receiving user input indicating selection of the user interface element approving the recommended adjustment, transmitting, by the monitoring server and to the alarm device, a command that causes the alarm device to perform the recommended adjustment to the setting from the unarmed status to the armed status that decreases the likelihood of damage to the property due to the peril.

2. The monitoring system of claim 1, wherein determining the risk that the peril will occur comprises:
obtaining sensor data from a plurality of properties indicating one or more risk factors of the plurality of properties;
obtaining damage data indicating a frequency of damage incidents at the plurality of properties caused by the peril;
identifying, based on the sensor data and the damage data, a weighted impact of each risk factor on the frequency of damage incidents caused by the peril; and
applying the weighted impact of each risk factor to the risk factors determined from the sensor data obtained from the sensors at the property.

3. The monitoring system of claim 1, wherein determining the risk that the peril will occur comprises determining a probability that the peril will occur at the property.

4. The monitoring system of claim 1, wherein selecting the particular risk factor comprises selecting the risk factor having the highest risk for the peril.

5. The monitoring system of claim 1, the operations comprising determining a risk that each of multiple types of perils will occur at the property.

6. The monitoring system of claim 5, wherein selecting the particular risk factor comprises:
receiving, through a user interface of the computing device, user input data indicating a user risk tolerance for each of the multiple types of perils;
determining, based on the user risk tolerance for each of the multiple types of perils, the peril having the lowest user risk tolerance; and
selecting the risk factor having the highest risk for the peril having the lowest user risk tolerance.

7. The monitoring system of claim 1, the operations comprising:
determining that the risk for the peril exceeds a risk tolerance for the peril; and
in response to determining that the risk for the peril exceeds the risk tolerance for the peril, providing an indication of the recommended adjustment to the setting of the alarm device.

8. The monitoring system of claim 1, the operations comprising:
determining a combined risk for multiple types of perils, wherein selecting the particular risk factor comprises selecting the risk factor having the highest contribution of risk to the combined risk;
determining that the combined risk exceeds a combined risk tolerance; and
in response to determining that the combined risk exceeds the combined risk tolerance, providing an indication of the recommended adjustment to the setting of the alarm device.

9. The monitoring system of claim 1, wherein the peril comprises an incident that causes damage to the property.

10. The monitoring system of claim 1, wherein the peril comprises one of a fire-related peril, a water-related peril, or a security-related peril.

11. The monitoring system of claim 1, wherein the notification includes an indication of the peril and an indication of the determined risk that the peril will occur at the property.

12. The monitoring system of claim 11, wherein the indication of the determined risk that the peril will occur at the property includes a chart indicating a time-varying risk of the peril.

13. The monitoring system of claim 1, comprising a lock, wherein the sensor data includes lock sensor data indicating an unlocked status of the lock, the operations comprising:
determining a second recommended adjustment to the setting of the lock from the unlocked status to a locked status; and
transmitting, by the monitoring server and to the lock, a second command that causes the second recommended adjustment to the setting of the lock from the unlocked status to the locked status.

14. The monitoring system of claim 1, wherein:
the alarm device operates based on a schedule; and
the recommended adjustment to the setting of the alarm device further comprises an adjustment to the schedule, the operations comprising:
transmitting, by the monitoring server, a second command that causes the recommended adjustment to the schedule.

15. The monitoring system of claim 1, wherein the sensors at the property comprise one or more of a microphone, a motion sensor, or a camera, the operations comprising:
determining, by the monitoring server and based on the sensor data from the sensors at the property, that the property is unoccupied; and
determining, based on the risk factors and based on determining that the property is unoccupied, the risk that the peril will occur at the property.

16. The monitoring system of claim 1, comprising:
storing data representing a plurality of risk factor remedies, wherein each risk factor remedy is associated with one or more risk factors and defines one or more actions for reducing the risk that the peril will occur at the property; and
selecting, from the plurality of risk factor remedies, a particular risk factor remedy associated with the particular risk factor, wherein the particular risk factor remedy defines one or more actions including the recommended adjustment to the setting of the alarm device.

17. A method, comprising:
obtaining, by a monitoring server, sensor data from sensors at a property, the sensor data including data indicating an unarmed status of a setting of an alarm device at the property;
determining, by the monitoring server and for a peril, a risk that the peril will occur at the property based on risk factors determined from the sensor data;
selecting, by the monitoring server, a particular risk factor from the risk factors based on the risk that the peril will occur at the property;
determining, using the particular risk factor and the data indicating the unarmed status of the setting of the alarm device at the property, a recommended adjustment to the setting i) of the alarm device at the property ii) from the unarmed status to an armed status that decreases the likelihood of damage to the property due to the peril;
providing, for display by a computing device, a notification including:
an indication of the particular risk factor; and
a user interface element enabling selection of an option to approve the recommended adjustment to the setting that decreases the likelihood of damage to the property; and
in response to receiving user input indicating selection of the user interface element approving the recommended adjustment, transmitting, by the monitoring server and to the alarm device, a command that causes the alarm device to perform the recommended adjustment to the setting from the unarmed status to the armed status that decreases the likelihood of damage to the property due to the peril.

18. A non-transitory computer-readable medium storing software comprising instructions executable by one or more computers which, upon such execution, cause the one or more computers to perform operations comprising:
obtaining, by a monitoring server, sensor data from sensors at a property, the sensor data including data indicating an unarmed status of a setting of an alarm device at the property;
determining, by the monitoring server and for a peril, a risk that the peril will occur at the property based on risk factors determined from the sensor data;
selecting, by the monitoring server, a particular risk factor from the risk factors based on the risk that the peril will occur at the property;
determining, using the particular risk factor and the data indicating the unarmed status of the setting of the alarm device at the property, a recommended adjustment to the setting i) of the alarm device at the property ii) from the unarmed status to an armed status that decreases the likelihood of damage to the property due to the peril;
providing, for display by a computing device, a notification including:
an indication of the particular risk factor; and
a user interface element enabling selection of an option to approve the recommended adjustment to the setting that decreases the likelihood of damage to the property; and
in response to receiving user input indicating selection of the user interface element approving the recommended adjustment, transmitting, by the monitoring server and to the alarm device, a command that causes the alarm device to perform the recommended adjustment to the setting from the unarmed status to the armed status that decreases the likelihood of damage to the property due to the peril.

19. A monitoring system comprising:
one or more computers and one or more computer storage media storing instructions that are operable, when executed by the one or more computers, to cause the one or more computers to perform operations comprising:
obtaining, by a monitoring server, sensor data from sensors at a property, the sensor data including data indicating an unlocked status of a setting of a lock at the property;
determining, by the monitoring server and for a peril, a risk that the peril will occur at the property based on risk factors determined from the sensor data;
selecting, by the monitoring server, a particular risk factor from the risk factors based on the risk that the peril will occur at the property;
determining, using the particular risk factor and the data indicating the unlocked status of the lock at the property, a recommended adjustment to the setting i) of the lock at the property ii) from the unlocked status to a locked status that decreases the likelihood of damage to the property due to the peril;
providing, for display by a computing device, a notification including:

an indication of the particular risk factor; and a user interface element enabling selection of an option to approve the recommended adjustment to the setting that decreases the likelihood of damage to the property; and in response to receiving user input indicating selection of the user interface element approving the recommended adjustment, transmitting, by the monitoring server and to the lock, a command that causes the lock to perform the recommended adjustment to the setting from the unlocked status to the locked status that decreases the likelihood of damage to the property due to the peril.

20. A method, comprising:

obtaining, by a monitoring server, sensor data from sensors at a property, the sensor data including data indicating an unlocked status of a setting of a lock at the property;

determining, by the monitoring server and for a peril, a risk that the peril will occur at the property based on risk factors determined from the sensor data;

selecting, by the monitoring server, a particular risk factor from the risk factors based on the risk that the peril will occur at the property;

determining, using the particular risk factor and the data indicating the unlocked status of the lock at the property, a recommended adjustment to the setting i) of the lock at the property ii) from the unlocked status to a locked status that decreases the likelihood of damage to the property due to the peril;

providing, for display by a computing device, a notification including:

an indication of the particular risk factor; and a user interface element enabling selection of an option to approve the recommended adjustment to the setting that decreases the likelihood of damage to the property; and in response to receiving user input indicating selection of the user interface element approving the recommended adjustment, transmitting, by the monitoring server and to the lock, a command that causes the lock to perform the recommended adjustment to the setting from the unlocked status to the locked status that decreases the likelihood of damage to the property due to the peril.

21. A non-transitory computer-readable medium storing software comprising instructions executable by one or more computers which, upon such execution, cause the one or more computers to perform operations comprising:

obtaining, by a monitoring server, sensor data from sensors at a property, the sensor data including data indicating an unlocked status of a setting of a lock at the property;

determining, by the monitoring server and for a peril, a risk that the peril will occur at the property based on risk factors determined from the sensor data;

selecting, by the monitoring server, a particular risk factor from the risk factors based on the risk that the peril will occur at the property;

determining, using the particular risk factor and the data indicating the unlocked status of the lock at the property, a recommended adjustment to the setting i) of the lock at the property ii) from the unlocked status to a locked status that decreases the likelihood of damage to the property due to the peril;

providing, for display by a computing device, a notification including:

an indication of the particular risk factor; and a user interface element enabling selection of an option to approve the recommended adjustment to the setting that decreases the likelihood of damage to the property; and in response to receiving user input indicating selection of the user interface element approving the recommended adjustment, transmitting, by the monitoring server and to the lock, a command that causes the lock to perform the recommended adjustment to the setting from the unlocked status to the locked status that decreases the likelihood of damage to the property due to the peril.

* * * * *